United States Patent [19]

Arimoto et al.

[11] Patent Number: 5,289,001
[45] Date of Patent: Feb. 22, 1994

[54] LASER BEAM SCANNING APPARATUS HAVING A VARIABLE FOCAL DISTANCE DEVICE AND THE VARIABLE FOCAL DISTANCE DEVICE FOR USE IN THE APPARATUS

[75] Inventors: Akira Arimoto, Kodaira; Susumu Saito, Hachioji, both of Japan

[73] Assignees: Hitachi, Ltd.; Hitachi Koki Co., Ltd., Tokyo, Japan

[21] Appl. No.: 995,011

[22] Filed: Dec. 22, 1992

Related U.S. Application Data

[63] Continuation-in-part of Ser. No. 631,257, Dec. 20, 1990, Pat. No. 5,196,697, which is a continuation-in-part of Ser. No. 390,400, Aug. 7, 1989, Pat. No. 5,006,705, which is a continuation-in-part of Ser. No. 501,879, Mar. 30, 1990, Pat. No. 5,053,619.

[30] Foreign Application Priority Data

Dec. 26, 1989 [JP] Japan ................... 1-335084

[51] Int. Cl.⁵ .............................. H01J 3/14
[52] U.S. Cl. ........................ 250/236; 385/8
[58] Field of Search ........... 250/201.2, 234, 235, 250/236; 359/245, 254; 385/2, 3, 8; 346/107, 108

[56] References Cited

U.S. PATENT DOCUMENTS 4,856,861  8/1989  Miyawaki et al. ............... 385/5

OTHER PUBLICATIONS

Arimoto et al, "Optical System of an Ultrahigh-speed Laser-beam Printer," *Tech Digest of Conference on Laser and Electro-Optical Systems*, CLEOS '80 (1980), pp. 76-77.

Primary Examiner—David C. Nelms
Attorney, Agent, or Firm—Fay, Sharpe, Beall, Fagan, Minnich & McKee

[57] ABSTRACT

In a variable density scanning apparatus, a variable focal distance device is provided in a scanning optical system. This variable focal distance device is formed of a light waveguide having a plurality of electrodes provided of which the lengths along the direction of incident laser beam are decreased or increased with the increase of the distance from the central electrode. The voltage to be applied between the electrodes is controlled in accordance with a desired dot pattern so as to change the refractive index of the light waveguide through which the laser beam is passed, thereby effectively changing the focal distance so that the diameter of the scanning laser beam spot can be changed in one dimension.

5 Claims, 10 Drawing Sheets

HIGH-ORDER LIGHT  0-ORDER LIGHT  HIGH-ORDER LIGHT

FIG. 16

LASER BEAM SCANNING APPARATUS HAVING A VARIABLE FOCAL DISTANCE DEVICE AND THE VARIABLE FOCAL DISTANCE DEVICE FOR USE IN THE APPARATUS

CROSS-REFERENCE TO RELATED APPLICATIONS

This application is a continuation-in-part application of U.S. Ser. No. 07/631,257 filed Dec. 20, 1990, now U.S. Pat. No. 5,196,697, which is a continuation in part application of U.S. Ser. No. 07/390,400 filed Aug. 7, 1989, now U.S. Pat. No. 5,006,705, and U.S. Ser. No. 07/501,879 filed Mar. 30, 1990, now U.S. Pat. No. 5,053,619. The contents of those U.S. applications are incorporated herein by reference.

BACKGROUND OF THE INVENTION

This invention relates to laser beam scanning apparatus having a variable focal distance device of which the focal distance can be changed by electrical means, and the variable focal distance device for use in the apparatus and particularly to a laser beam scanning apparatus having a variable focal distance device which can substantially change the diameter of the scanning spot in one-dimentional direction.

The conventional laser beam scanning apparatus, such as a laser printer, changes the focal distance of the laser beam scanning lens (for example, an fθ lens) by mechanically changing the distance(s) between the combined lenses which constitute the scanning lens, or by inserting another optical device therebetween.

This mechanical means has, in effect, a difficulty in changing the focal distance in less than one ms (millisecond).

However, the technique for changing the focal distance at high speed has been demanded in the optical disc apparatus for recording multilevel information and in the laser printer for halftone printing.

An example of this technique for changing the focal distance at high speed is described in an article of Tech Digest of Conference on Laser and Electro-Optical Systems, entitled "Optical System of an Ultra-high speed Laser Beam Printer", Arimoto et al., CLEOS'80, p.76, WII2 (1980).

SUMMARY OF THE INVENTION

It is a first object of the invention to provide a laser beam scanning apparatus capable of changing the focal distance on the optical axis of the scanning optical system by electrical means, and of displaying or printing high-definition halftones.

It is a second object of the invention to provide a variable focal distance device capable of effectively changing the focal distance of the scanning optical system by electrical means, thereby to enable the diameter of the scanning spot to be changed in one dimension.

In order to display high-definition halftones, it is necessary to use the variable spot technique by which the beam diameter on the image surface can be changed at high speed.

As to the variable spot technique, the present inventors proposed a printer in which the density can be changed by spot diameter conversion using the electro-optical effect as disclosed in U.S. Pat. No. 4,768,043.

In this proposed printer, the spot diameter is changed by the polarization characteristic of light, and thus the amount of emitted light is changed with the change of the spot diameter.

Moreover, the present inventors proposed, in U.S. Ser. No.07/501,879 (filing data Mar. 30, 1990), a variable density laser beam scanning apparatus in which a dynamic diffraction grating acting in the sub-scanning direction is provided on the light path to produce ± first-order diffracted light and 0-order diffracted light, which are used effectively with almost no loss so that the spot diameter can be substantially changed in one dimension.

It is a feature of the invention to provide a scanning optical system having a variable focal distance device which is formed of an optical waveguide having a plurality of equally spaced strip-like electrodes, of which the lengths in the direction of the incident laser beam are decreased or increased with the increase of the distance from the central electrode. The voltage to be applied between the electrodes is controlled in accordance with a desired dot density to change the refractive index of the optical waveguide through which the laser beam is passed, thereby effectively changing the focal distance so that the diameter of the scanning laser beam spot can be changed in one dimension. The variable focal distance device is disposed in the scanning optical system so that the diameter of the scanning laser beam spot can be changed in the direction perpendicular to the scanning direction.

According to one feature of this invention, it is desirable to determine the lengths of the plurality of strip-shaped electrodes of the optical waveguide in accordance with the equation $lm = L - am^2$ or $lm = L + am^2$, where lm is the length of the m-th electrode from the central electrode, L is the length of the central electrode, and a is a constant.

According to another feature of this invention, a variable focal distance device is provided in the scanning optical system, this variable focal distance device having a plurality of equally spaced strip-shaped electrodes of which the lengths are equal in the direction of the incident light. The voltage to be applied between these electrodes is controlled to effectively change the focal distance in accordance with the a desired dot density, thereby changing the diameter of the scanning beam spot in one dimension. The variable focal distance device is so disposed in the scanning optical system as to change the diameter of the scanning beam spot in the direction perpendicular to the scanning direction.

When this is done so, the distribution of the refractive index of the optical waveguide can be effectively made equal to that of the normal lens, or the phase distribution of the laser beam passed through the optical waveguide is the same as that of light passed through the normal lens, thus enabling a change in the focal distance.

Still further advantages of the present invention will become apparent to those of ordinary skill in the art upon reading and understanding the following detailed description of the preferred and alternate embodiments.

The invention will be described in conjunction with certain drawings which are for the purpose of illustrating the preferred and alternate embodiments of the invention only, and not for the purposes of limiting the same.

DESCRIPTION OF THE PREFERRED EMBODIMENTS

Figure 1A:
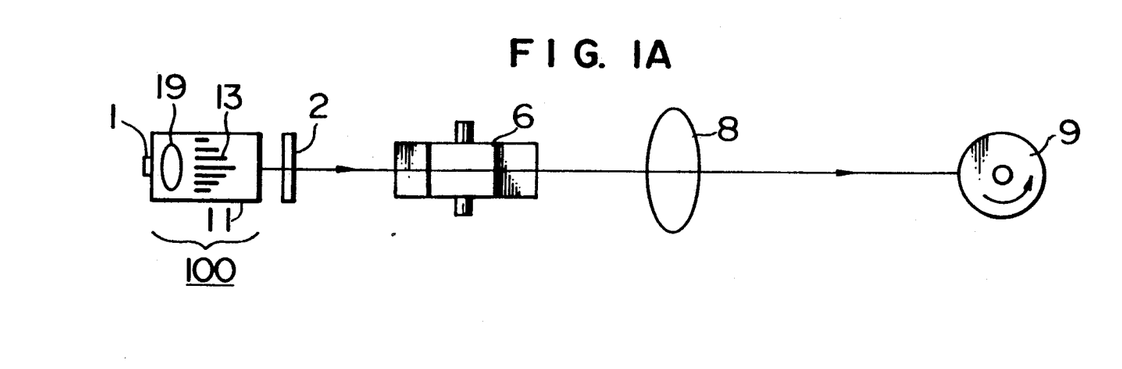
FIG. 1A and FIG. 1B are a side view of one embodiment of a laser printer of the invention, and a top view thereof, respectively.
Figure 1B:
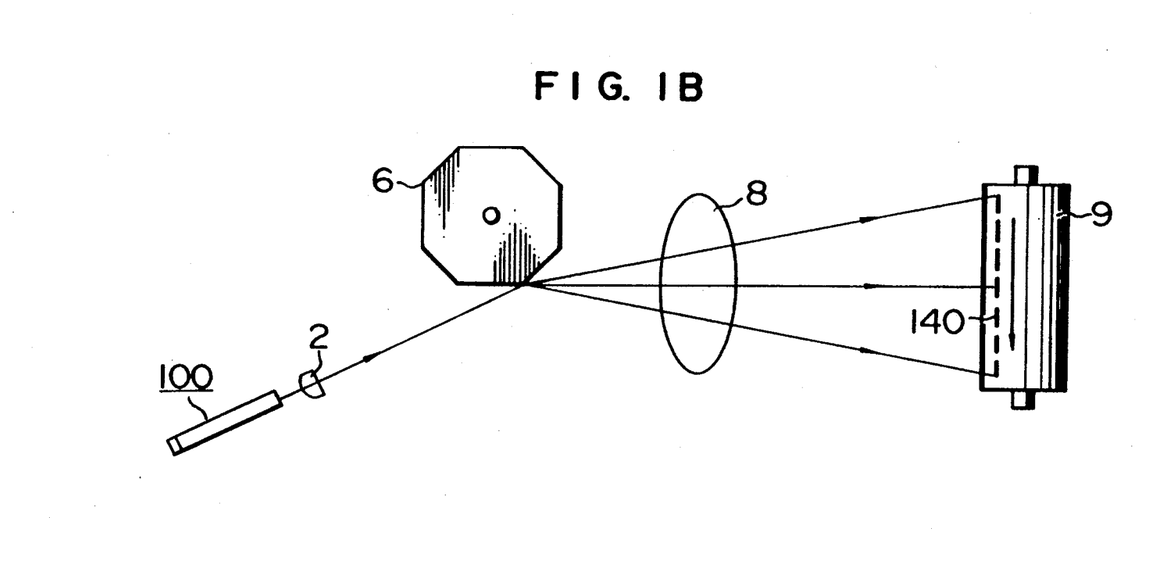

FIG. 1A is a side view of one embodiment of a laser beam scanning apparatus of the invention, and FIG. 1B is a top view thereof.

There is shown a variable focal distance device 100 in which a laser beam from a light source 1, such as a semiconductor laser, is incident to an optical waveguide and made parallel by a thin film lens 19 which is provided in the optical waveguide. The parallel laser beam is conducted through the optical waveguide, in which electrodes 13 are provided, to a scanning optical system.

In this case, since the variable focal distance device 100 changes the focal distance only in one dimension, it is disposed so that its acting direction coincides with the direction (the sub-scanning direction) perpendicular to the deflection direction (the main scanning direction) of the laser beam scanned by a polygon mirror 6, or with the direction of a moving image surface corresponding to the rotation direction of a photosensitive drum 9.

One embodiment of the variable focal distance device of the invention which is used in the embodiment shown in FIG. 1 will be described with reference to FIG. 2, which is a perspective view of the device.

Titanium Ti is diffused in the surface of an electro-optical crystal, such as $LiNbO_3$ substrate 11, to form a thin film 12 having a higher refractive index than the surroundings, and which has a thickness of, for example, about 1 $\mu$m, or to form the optical waveguide. Shown at 13 are a plurality of electrodes for effecting a variable focal distance, which extend in the direction of the incident laser beam from a semiconductor laser 1 and, for example, are arranged at equal intervals on the thin film 12.

Figure 3:
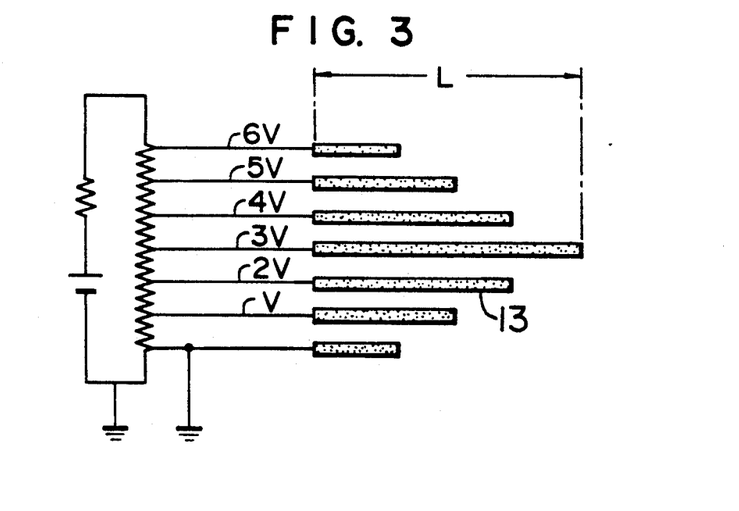
FIG. 3 is a detailed diagram of electrodes provided in the variable focal distance device shown in FIG. 2.

FIG. 3 shows the details of these electrodes.

In FIG. 3, a plurality (seven in FIG. 3) of strip-shaped electrodes are arranged at equal intervals, and the lengths of these electrodes are determined by the equation $lm = L - am^2$, where L is the length of the center electrode, a is a constant and lm is the length of m-th electrode from the center electrode.

If the refractive index of the thin film 12 is changed by $\Delta n$ when a DC voltage of value V is applied between the electrodes, the light path of the light beam passing through each electrode is changed by $am^2 \cdot \Delta n$ relative to the light path passing through the central electrode.

Figure 4:
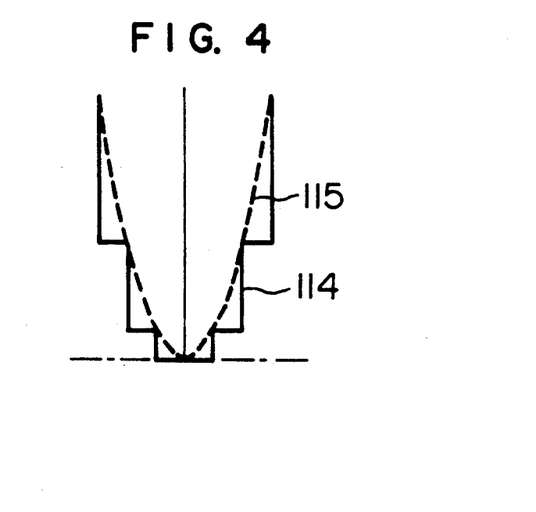
FIG. 4 is a diagram showing the phase distribution of the laser beam emitted from the variable focal distance device shown in FIG. 2.

As a result, the light path difference changes substantially along a quadratic curve 115 as shown in FIG. 4. A light phase distribution 114 of the emitted laser beam can be obtained.

This phase distribution is substantially the same as that of a light beam passing through the center (optical axis) and peripheral portion of a normal lens.

In this case, if a proportional relation $V \propto \Delta n$ is present between the value V of the applied voltage and the change $\Delta n$ of the refractive index, the light path difference of the laser beam passing through the optical waveguide can be changed by controlling the applied voltage V, or the focal distance can be changed.

Figure 5:
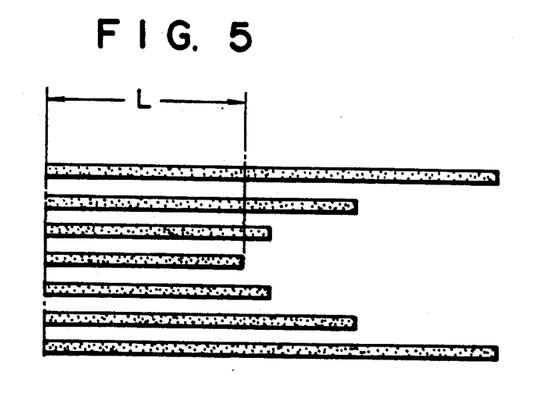
FIG. 5 is a diagram showing another arrangement of the electrodes provided in the variable focal distance device shown in FIG. 2.

While in FIGS. 13A to 13I the central electrode is the longest, or L and the other electrodes off the optical axis are decreased in their length with the increase of the distance from the optical axis, the electrodes of the optical axis may be contrarily increased with the increase of the distance from the optical axis according to the equation of $lm = L + am^2$ (where lm is the length of the m-th electrode) for the same lens action as shown in FIG. 5.

In this case, however, the light path difference is opposite in sign to the case of FIGS. 13A to 13I. That is, if a convex lens can be formed by the electrode arrangement in FIGS. 13A to 13I, the electrode arrangement in FIG. 5 can form a concave lens.

Figure 14A:
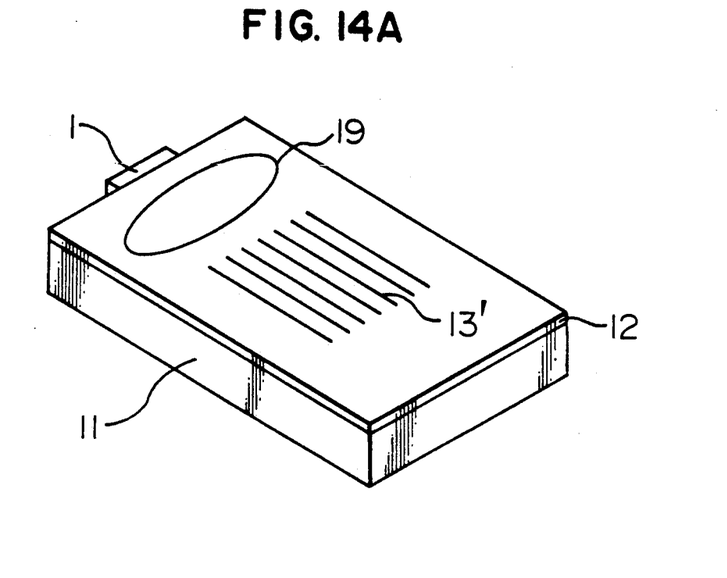
FIG. 14A and FIG. 14B are, respectively, a perspective view of one embodiment of a variable focal distance device of the invention used in the embodiment shown in FIG. 1, and a detailed diagram of the electrodes of the variable focal distance device shown in FIG. 14A.

FIG. 14A is a perspective view of another embodiment of the variable focal distance device of the invention used in the embodiment shown in FIG. 1. The substrate 11 and the thin film 12 are the same as those in FIG. 2. Electrodes 13' for changing the focal distance are so formed on the thin film 12 as to be, for example, equally spaced along a direction perpendicular to that of the incident light emitted from the semiconductor laser 1. The lengths of the electrodes 13′ are all equal.

Figure 14B:
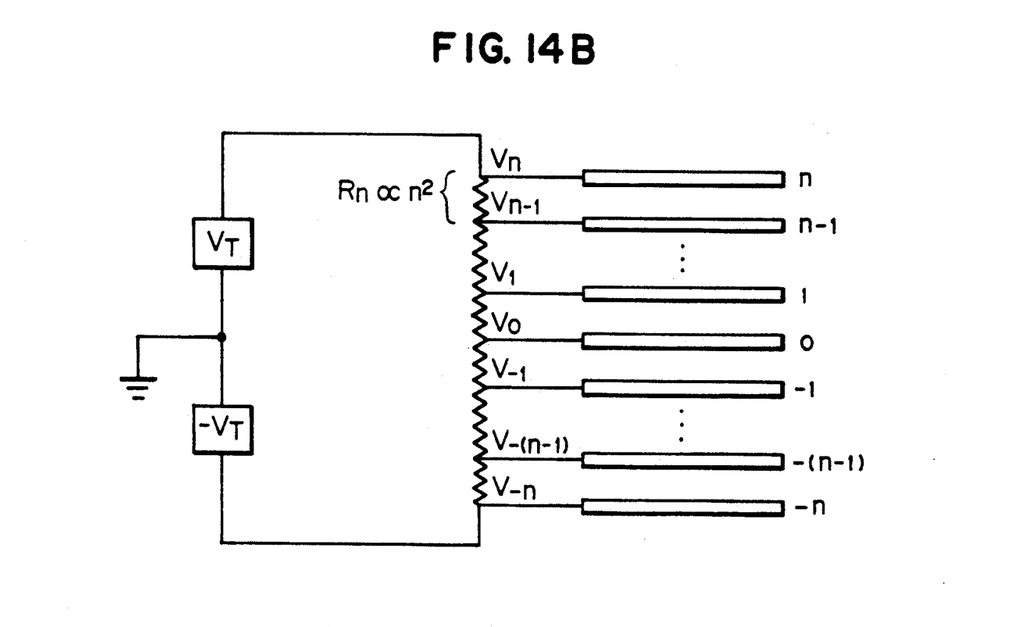

FIG. 14B shows the detail of the electrodes.

Referring to FIG. 14B, a plurality (2n+1) of equal-length electrodes 13′ are disposed at equal intervals. These electrodes are attached with numbers − n through n (n is an integer), respectively. These electrodes are supplied with voltages, respectively. The voltage to be applied to the electrode n is expressed by the following equation (a is a proportional constant):

$$V|n| = \frac{a \cdot |n| \cdot (|n| + 1) \cdot (2 \cdot |n| + 1)}{6}$$

A resistance Rn connected between the adjacent potential points has a value proportional to $n^2$, or $Rn \propto n^2$. A voltage of $2V_T$ may be applied between the opposite ends of a series of all resistances. Therefore, since the voltage applied between the electrodes has a quadratic distribution, the refractive index of the optical waveguide can be changed, thus changing the light path difference of the laser beam passing through the optical waveguide, or changing the focal distance to the emitted laser beam.

The operation of the laser beam scanning apparatus shown in FIG. 1 will be described.

The halftone display/printing by using dots on a binary medium is generally realized by area modulation.

Figure 6:
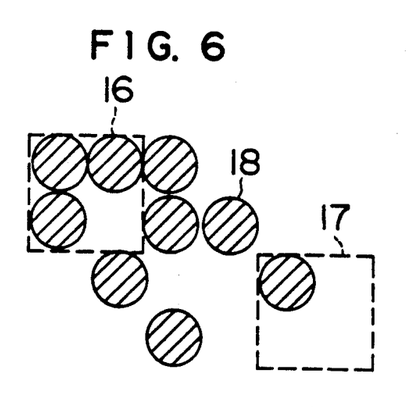
FIG. 6 is a diagram to which reference is made in explaining the area modulation for realizing the halftone.

In other words, as shown in FIG. 6, a dark region 16 has many dots for a densely black area, while a bright region 17 has few dots for a relatively bright or light area.

Figure 7:
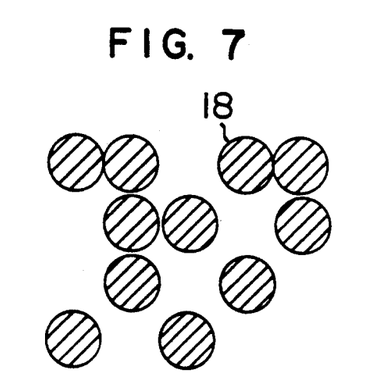
FIG. 7 is a diagram to which reference is made in explaining the realization of the halftone by raster scanning.

When the halftone is represented by a raster scan as in the laser printer, it is necessary to change the number of black dots 18 according to the brightness on each raster as shown in FIG. 7.

In this method, however, in order to display high-resolution and high-gradation halftone, it is necessary to fast-scan a small-diameter spot. For this purpose, the revolution rate of the rotating multimirror (polygon mirror) and the laser modulation frequency must be increased.

Figure 2:
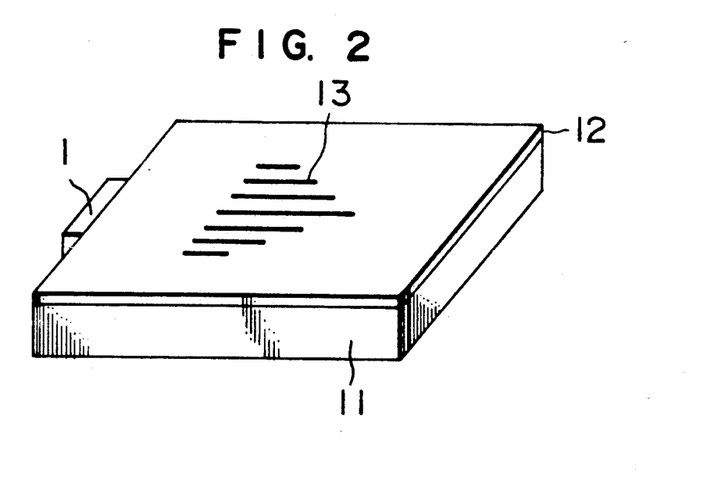
FIG. 2 is a perspective view of one embodiment of a variable focal distance device of the invention used in the embodiment shown in FIG. 1.

Here, the variable focal distance device shown in FIG. 2 is used to enable the high-resolution and high-gradation halftone to be displayed or printed without increasing the revolution rate of the rotating multimirror.

The conventional laser printer does not employ the variable focal distance device 100 shown in FIG. 1, but instead has a light modulator, for example, an ultrasonic light modulator, provided to modulate the intensity of the laser beam by an intermittent signal according to the print information from the host computer. The laser beam modulated in its intensity by this light modulator scans the photosensitive drum 9 via the rotating multimirror 6. At this time, a special scanning lens, called the f θ lens is used as the scanning lens 8 in order to focus the beam on the drum through the rotating multimirror 6 along a scanning line 140 at a constant speed. The resolution of the printed image depends on the diameter of the laser beam irradiated on the drum.

The following printing process is the same as in the general electrophotographic copying machine. In other words, when the laser beam is irradiated on the photosensitive drum of which the whole surface is electrified, only the irradiated area loses the charge due to the photoconductive effect, so that a latent image is written in that area. A toner is deposited on this latent image and paper is pressed thereon so that the toner is transferred to the paper. This paper is then heated for fixing. In this case, direct modulation can be made by use of a semiconductor laser, thus leading to a small-sized apparatus.

In the embodiment of FIG. 1, the variable focal distance device 100 is used to conduct the laser beam from the laser light source 1 to the scanning optical system through the optical waveguide as described above. Here, the area modulation is considered as shown in FIG. 9B. In the prior art, as shown in FIG. 9A, the smallest units (dots) are used, and laser beam scanning is made, for example, seven times to realize the area modulation. According to the embodiment of FIG. 1, as shown in FIG. 9B, the same area modulation can be realized by a single scan of the laser beam, and thus the modulation frequency can be reduced to 1/7 the frequency used in the prior art. This fact will be described in detail with reference to FIG. 8.

Figure 8:
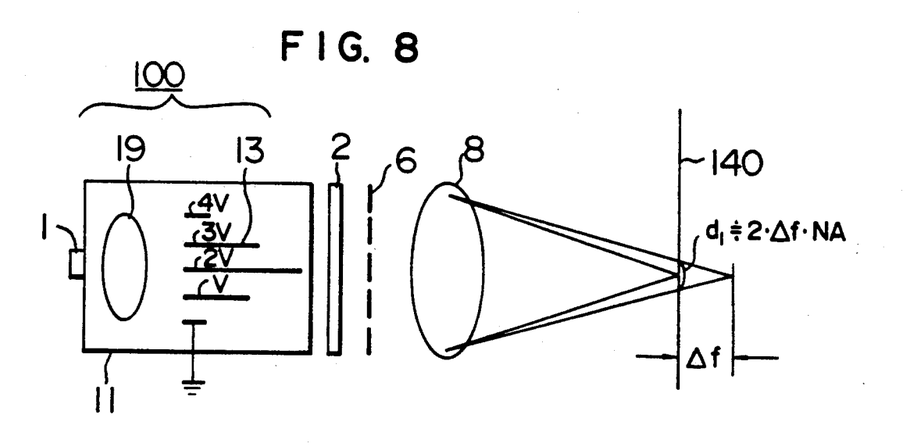
FIG. 8 is a diagram to which reference is made in explaining the operation of the embodiment shown in FIG. 1 for changing the spot diameter.
Figure 9A:
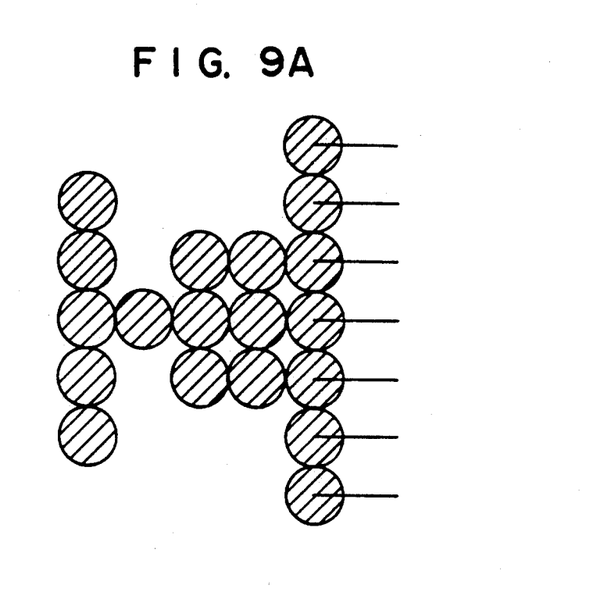
FIG. 9A and FIG. 9B are, respectively, a diagram to which reference is made in explaining the conventional method for displaying or printing the halftone, and a diagram to which reference is made in explaining the method for displaying or printing the halftone by use of the variable focal distance device according to this invention.
Figure 9B:
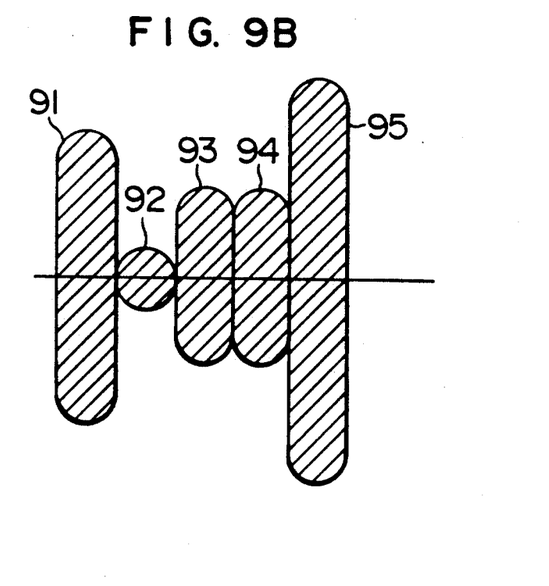

FIG. 8 shows the scanning optical system relative to the sub-scanning direction, which is a rearrangement of the side view of FIG. 1A. It is assumed that when no voltage is applied to the electrodes 13, a spot of diameter $d_o$ is irradiated on the photosensitive drum along the scanning line 140. The diameter of the laser beam spot is given as $$d_o \approx \lambda/NA$$

where $\lambda$ is the wavelength of the laser beam, and NA is the numerical aperture of the scanning lens 8.

If the focal point on the photosensitive drum surface is changed by $\Delta f$ as illustrated by applying the voltage V between the electrodes 13 of the variable focal distance device 100 to change the focal distance in the sub-scanning direction, the maximum diameter $d_1$ in the sub-scanning direction on the scanning line 140 is given as $$d_1 = 2 \cdot \Delta f \cdot NA$$

Thus, the spot diameter $d_1$ on the photosensitive drum surface can be arbitrarily changed relative to the diameter $d_o$ which is obtained when no voltage V is applied, by changing the applied voltage to the electrodes 13 to control $\Delta f$.

In FIG. 9B, 92 represents the shape of the spot of diameter $d_o$ with no voltage applied to electrodes 13, 93 and 94 the shape of the spot of which the diameter $d_1$ is made three times as large as $d_o$ by changing the voltage to the electrodes 13, and 91 and 95 the shape of the spot of which the diameter $d_1$ is, respectively, made five times and seven times as large as $d_o$ by changing the voltage to the electrodes 13. Therefore, while in the prior art shown in FIG. 9A a dot pattern is obtained by seven times of scanning, in this embodiment substantially the same dot pattern can be obtained by a single scan by controlling the voltage to the electrodes 13 in accordance with the dot pattern. In this case, the drive current to the laser light source 1 preferably should be controlled in accordance with the dot pattern to be recorded, to change the power of the laser beam with the change of the spot diameter.

Figure 15A:
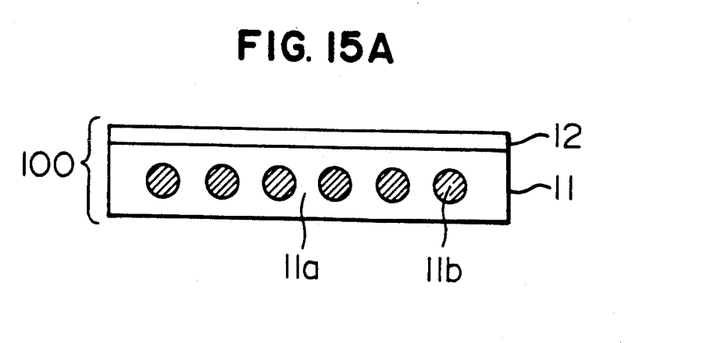
FIG. 15A and FIG. 15B are, respectively, a front view of the beam exiting end surface of the variable focal distance device of the invention, and a diagram showing the spot of the beam exiting from the variable focal distance device of the invention.
Figure 15B:
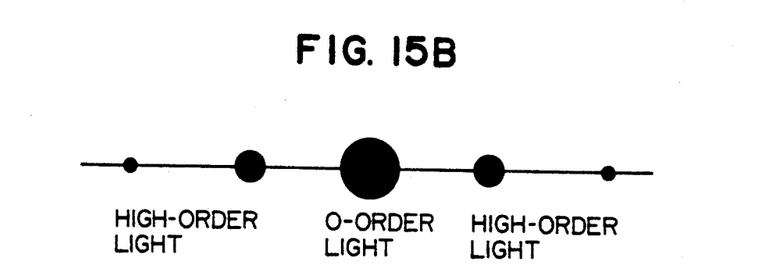
Figure 16:
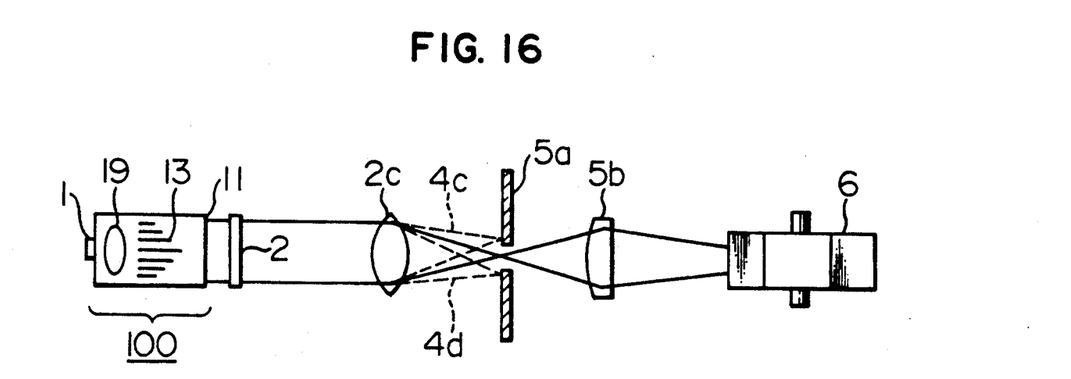
FIG. 16 shows the construction of part of a laser printer using the variable focal distance device of the invention.

FIG. 15A shows the beam exiting end surface of the variable focal distance device from which the laser beam exits. The variable focal distance device having electrodes equally spaced makes the laser beam difficult to pass a region 11a beneath the electrodes and easy to pass a region 11b between the electrodes, thus this region acting as a waveguide for the laser beam. Since a higher-intensity part of the laser beam exiting from the variable focal distance device than the other part occurs at equal intervals, the variable focal distance device also acts as a diffraction grating. Therefore, the light exiting from the variable focal distance device is diffracted by the action of the diffraction grating to produce ±n order, high-order, diffracted light rays as shown in FIG. 15B. The high-order diffracted light rays, when occur, adversely affects the printing operation of the laser printer, and thus they should be removed. FIG. 16 shows an arrangement for removing these high-order diffracted light rays.

In FIG. 16, the laser beam exiting from the variable focal distance device 100 is passed through the cylinder lens 2 and a convex lens 2c and once focused. Then, it is passed through a lens 5b and incident to the rotating multimirror 6. The laser beam exiting from the variable focal distance device has the high-order diffracted light rays due to the electrodes 13 or 13' formed in the variable focal distance device. In this embodiment, for removing the high-order diffracted light rays, the laser beam from the variable focal distance device is focused by the convex lens 2c and incident to a slit 5a located around the focal point so that the high-order diffracted light rays 4c, 4d are shut out and that only the 0-order light is passed through the slit.

In FIG. 9B, the dot pattern to be obtained is symmetrical relative to the raster 4 in FIG. 9A. This embodiment uses the symmetrical pattern relative to the vertical direction, and in this case, the code information corresponding to the light and shade pattern to be printed or displayed can be converted by a proper code converting operation to that corresponding to this symmetrical pattern with ease. Thus, this invention can be applied to the general light and dark pattern printing-/display apparatus, so that the number of times that the scanning is made in that apparatus can be reduced, as in the illustrated embodiment.

Next another embodiment of the present invention will be explained. This embodiment is particularly effective when a plurality of laser beams are scanned in parallel. U.S. Ser. No. 07/390,400 which was applied by the inventors of the present invention on Aug. 7, 1989 has shown that printing density can be converted even in the case of scanning a plurality of laser beams in parallel, by automatically changing over an interval of a plurality of scanning laser beams in the sub scanning direction in accordance with the switching of the printing density. However, in order to perform a more refined recording, it is necessary to change the spot diameter of each scanning beam in the sub scanning direction.

The embodiment shows, by taking the case of parallel scanning of two laser beams as an example, that the present invention is also effective for parallel scanning using a plurality of laser beams.

Figure 10:
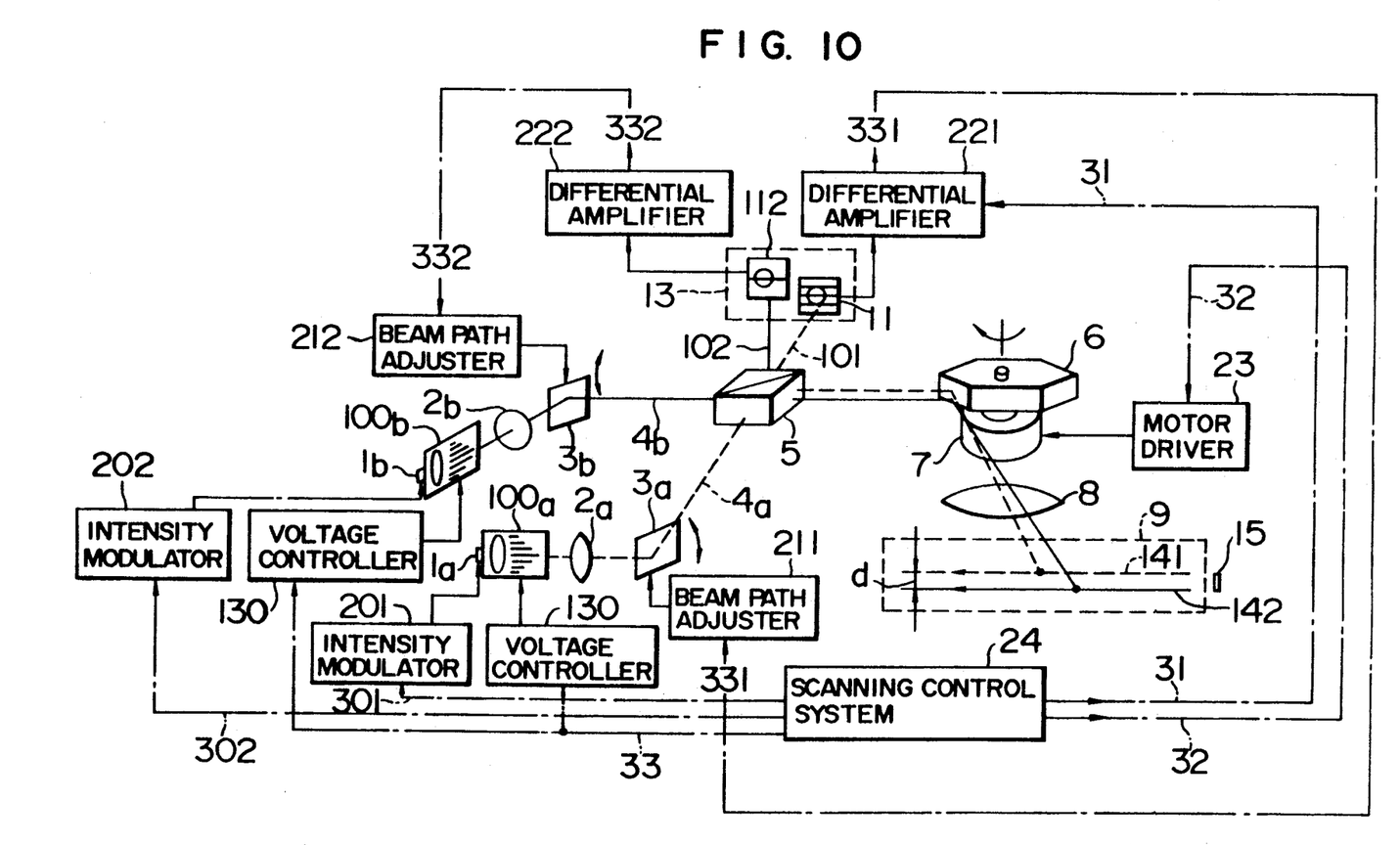
FIG. 10 shows a configuration of an embodiment in which the present invention is applied to a laser printer for parallel scanning of a plurality of beams.

FIG. 10 shows another embodiment of the present invention. Two variable focal distance means 100a and 100b emitting linearly polarized light beams are used with the polarization direction of each light beam virtually put in orthogonal arrangement each other (P and S polarization). Beams 4a and 4b emitted from the light sources are led into a polarizing beam splitter 5 through lenses 2a, 2b and mirrors 3a, 3b provided with beam path adjusters 211, 212 (which adjust the optical paths, for example, through such mechanism as rotary drive members attached to the mirrors 3a, 3b driven by outputs 331, 332 of differential amplifiers 221, 222). The beam splitter 5 performs a function of allowing the P-polarized light to go straight on and to deflect the S-polarized light through a right angle, and hence, the beams 4a and 4b, after passing through the beam splitter 5, advances virtually in the same direction. Then, they are deflected by a rotating polygonal mirror 6 as their deflecting means and passed through a scanning lens 8 so as to make parallel beam scanning on a scanned plane 9 as scanning lines 141 and 142.

The scanning beam detector 15 is for indicating the scan starting position for each beam scanning. Though not shown, output from this detector 15 is used as a sync. signal at the time when data for recording (printing) are delivered.

Figure 11:
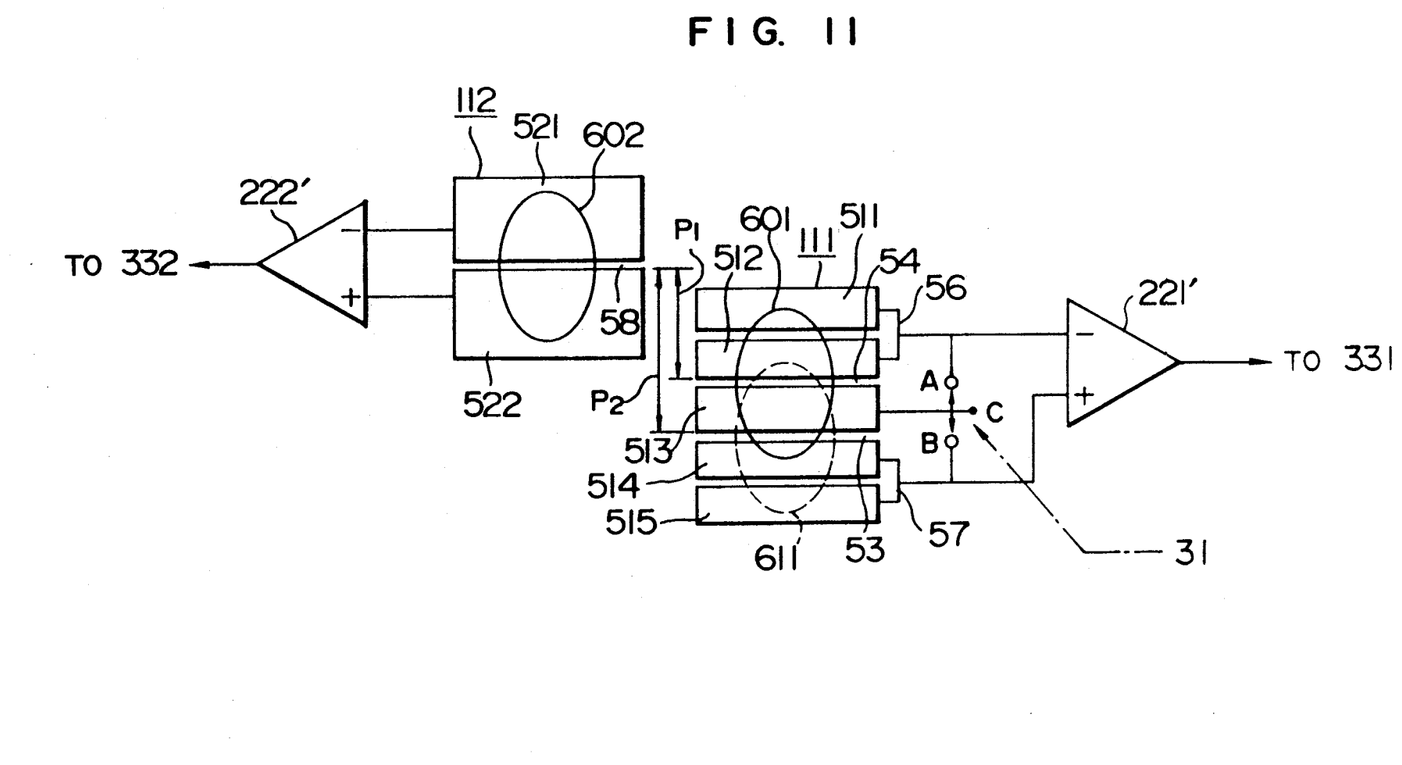
FIG. 11 shows a detailed structure of a light detection unit, which detects a beam position interval used in the embodiment shown in FIG. 10.

Here, the spacing d between the scanning lines 141 and 142 must be maintained at a suitable value corresponding to a prescribed pixel density. To achieve this, portions of incident beams 4a and 4b on the beam splitter 5 are taken out of it as beams for control 101 and 102 and introduced into beam position detectors 111 and 112. The detectors, as shown in FIG. 11 are of the arrangement basically divided into two sections in the direction perpendicular to the scanning directions, and adapted such that illumination power on both sides of the boundary of the divisional area are photoelectrically converted and taken out as electrical signals. Then, the signals are supplied to differential amplifiers 221 and 222 so that differential signals are produced to be supplied to beam path adjusters 211 and 212, whereby orientations of the mirrors 3a and 3b are adjusted so that the differential signals may be kept to zero at all times, and thus, the beams for control 101 and 102 can be steadily kept in positions of the respective boundary of divisional area of the detectors 111 and 112 in the center.

Now, suppose, in the detector 111 shown in FIG. 11, that a terminal C of a lead wire is held separate from both of a terminal A and a terminal B, and the output 331 resulting from the spot 601 of the position control beam 101 is kept to zero, while, in the detector 112, that the output 332 resulting from the spot 602 is kept to zero. In that event, since the detectors 111 and 112 are put in such relative positions as to bring the spacing d between the scanning beams on the scanned plane photo-sensitive drum plan 9 into being as shown in FIG. 10, the beams for control 101 and 102 are held stabilized and the spacing d between the scanning beams at this time can be kept constant.

Figure 12:
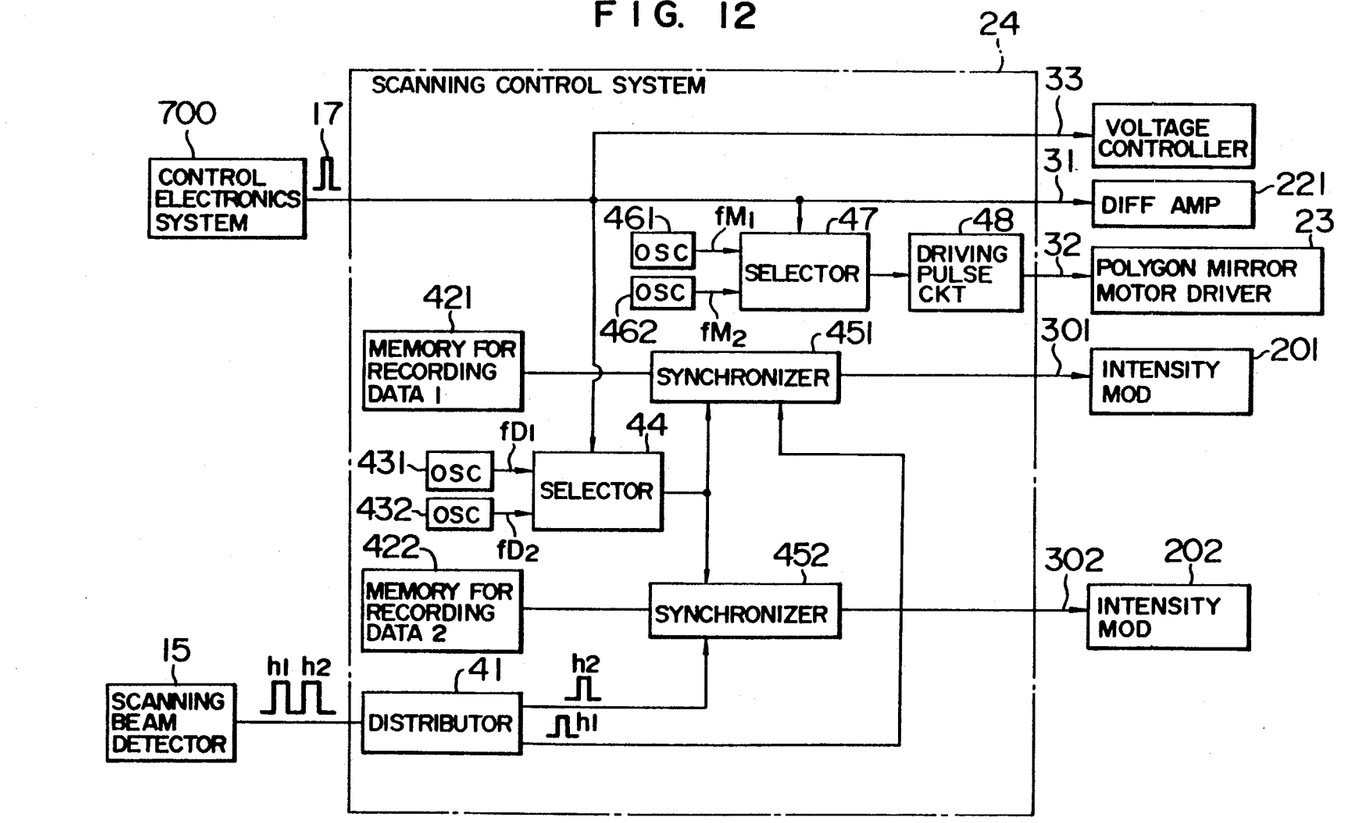
FIG. 12 shows a detailed structure of a scanning control unit which operates the embodiment of FIG. 10.

FIG. 12 is a diagram showing structure of scanning control system 24 (which is also shown in FIG. 12) for driving the above described scanning optical system. Operation for changing pixel density is started by a dot density transfer command 17 from a control electronics system 700.

Now, when a moving speed of the scanned plane 9 (i.e., the rotational speed of photo-sensitive drum) is keep constant, operations for changing pixel density both in the beam scanning direction and in the direction (sub scanning direction) perpendicular thereto will be considered in the following.

First, in the scanning direction, the change in pixel density is achieved by adjusting the pulse width for beam intensity modulation on the pixel signal thereby changing the exposed area. Signals 301 and 302 therefor are delivered from the scanning control system 24 to the intensity modulators 201 and 202. At this time, either of oscillation frequencies f D₁ and f D₂ from oscillators 431 and 432 is selected by a selector 44 in response to the dot density transfer command 17. Then, data for printing (recording) 301, 302 from memories of recording data 421 and 422 are delivered, at the selected frequencies, to their respective intensity modulators 201 and 202, whereby the laser beams are turned on/off at prescribed rates.

In order to change the pixel density in the direction (sub scanning direction) perpendicular to the scanning direction, the number of revolutions of the rotating polygonal mirror 6 for defecting the beams of light must be changed.

To achieve this, either of frequencies f M₁ and f M₂ for driving the rotating polygonal mirror is selected by selector 47 within the scanning control system 24 in response to the dot density transfer command 17, and this selected frequency is passed through a driving pulse circuit 48. Therein, a clock pulse for controlling the rotating speed is generated to operate a polygonal mirror motor driver 23 so that a suitable rotating speed is obtained to attain a prescribed number of scans.

When a plurality of beams, two beams 141 and 142 in FIG. 10, for example, perform scanning at the same time, the spacing d between the plural scanning beams must be changed by the amount (which is preset) corresponding to the change in the pixel density. This is achieved by moving the boundary of divisional area (between 53 and 54, shown in FIG. 11, to be described later) of one detector 111 of those for detecting beam position in accordance with the spacing between the scanning beams.

The above mentioned operation is also performed through the scanning control system 24 in response to the dot density transfer command 17. A detector system to perform the operation is shown in FIG. 11. Illustrated is the case where the spacing d between beams is varied in two ways.

The detector 111 is for the beam 101 and detects the position of its spot 601. The detector 111 is constructed of, for example, five divisions of photodetecting elements 511 to 515. Of these elements, 511 and 512 as well as 514 and 515 are respectively electrically coupled through lead wires 56 and 57, which in turn are coupled with a differential amplifier 221'. Meanwhile, the terminal C of a lead wire of the photodetecting element 513 is adapted to be selectively connected to either A or B according to a signal 31 from the scanning control system 24. When C is connected with A, the detector 111 functions as a divided-in-two detector with the boundary of divisional area 53 serving as the dividing line. By servo control corresponding to the differential signal provided at this time, the beam spot comes to a stabilized state when it is positioned as shown by dotted line 611 on the detector 111 in FIG. 11. Meanwhile, as to the detector 112 being formed of divided-in-two photodetecting elements 521 and 522, the beam spot 602 is stabilized thereon when it has the boundary of divisional area 58 in its center. At this time, the distance between the boundary of divisional area 53 and 58 of the two detectors is P₂, and corresponding to this value, the spacing d between the scanning beams 141 and 142 on the scanned plane is determined. Then, when C is connected with B in response to the signal 31 from the scanning control system 24, the detector 111 functions as divided-in-two detector having the boundary of divisional area 54 as the dividing line. The beam spot is now stabilized at the position 601 by the servo control dependent on the differential signal at this time. Then, the distance between the two beam spots becomes P₁, and corresponding to which, the beam spacing d on the scanned plane can take another value.

As described above, it is possible to change dot density by changing the interval between the scanning lines even in the scanning optical system which uses a plurality of beams. However, in order to perform printing of higher picture quality, it is necessary to change the laser spot diameter in the sub scanning direction by a suitable value as well as to adjust the interval of the scanning lines. As shown in FIG. 10, the variable focal distance means 100a and 100b are used. The variable focal distance means 100a and 100b are equipped with a pulurarity of electrodes 13 for changing deflective index of waveguide, as above mentioned. When a compressed pattern is to be printed, for example, the spot diameters of the two scanning laser beams 141 and 142 and the inter-scanning line interval d are set to have almost a suitable relation to perform the printing. In this case, the variable focal distance means 100a and 100b are not operated and the light beams from the laser sources 1a and 1b pass through the variable focal distance means 100a and 100b, respectively. When an expanded pattern is to be printed, the spot diameters in the sub scanning direction are expanded respectively in relation to the expansion of the interval d. In this case, the variable focal distance means 100a and 100b are operated by applying a suitable voltage V to the electrodes 13 on the wave guide and the spot diameters of the laser beams 4a and 4b from the variable focal distance means 100a and 100b can be expanded respectively, as described above with reference to FIG. 8. A suitable relationship can be maintained between the interval d between the scanning lines 141 and 142 and the values of the respective spot diameters, to perform printing of high picture quality.

Control of the above operation will be described below with reference to FIG. 12. A voltage control circuit 130 is operated based on the dot density change instruction 17 to generate a suitable voltage. The voltage control circuit 130 operates the variable focal distance means 100a and 100b. In the present embodiment, the variable focal distance means 100a and 100b are not operated to print a compressed pattern, and a suitable voltage is applied in synchronism with the drive frequency fM of the polygonal mirror 6, the laser modulation frequency fD and the changing of the division line of the light detector 111 only when an expanded pattern is to be printed. Thus, the spot diameter of each scanning laser beam in sub scanning direction is changed.

As described above, when a plurality of beams are to be scanned, it is always possible to maintain optimum values for an interval between adjacent scanning beams and for a spot diameter in order to change the picture element density or the printing dot density.

FIG. 13A to 13I are time charts for operating the scanning optical system shown in FIG. 10.

Figures 13A, 13B:
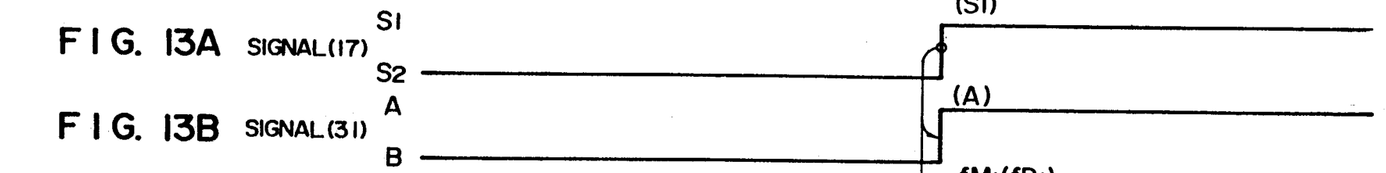
FIGS. 13A to 13I show a timing chart which shows the operation of the embodiment shown in FIG. 10.
Figure 13C:
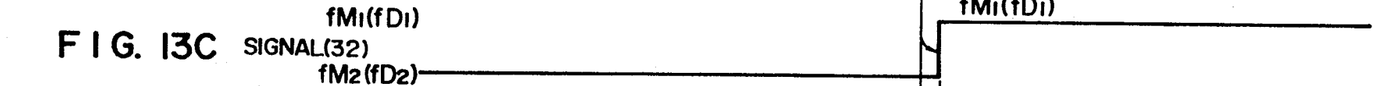
Figure 13D:
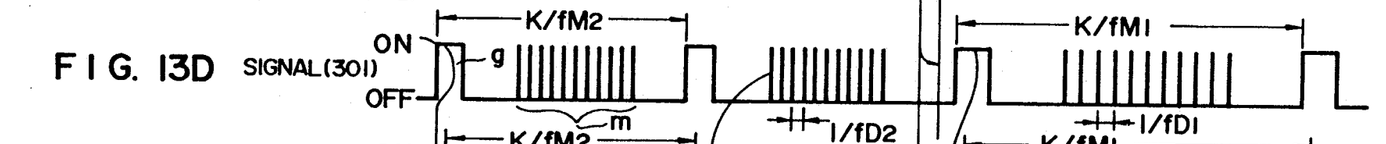
Figure 13E:
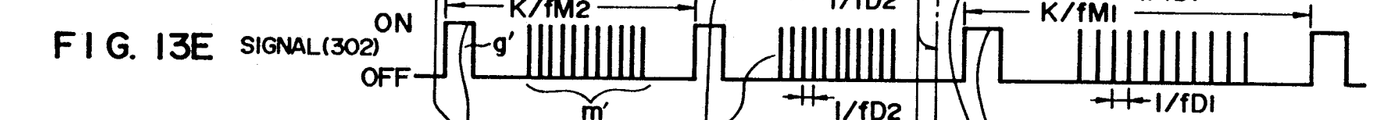
Figure 13F:
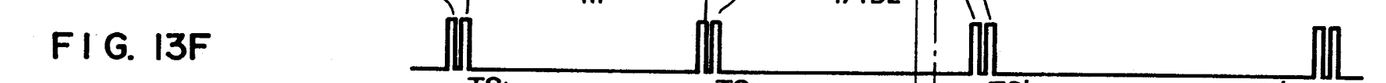
Figure 13G:
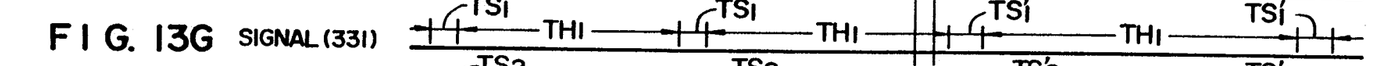
Figure 13H:
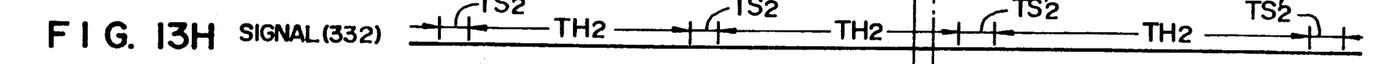

FIG. 13A shows states of two kinds of pixel densities (including dot density) S₁ and S₂ of which either one is selected. FIG. 13B shows the state of connection of the photodetecting element 513 of the detector 111 for controlling the beam position in FIG. 11, which occurs in succession to the state of the FIG. 13A (corresponding to the signal 31). FIG. 13C shows the state of the driving frequency f M₁ or f M₂ of the rotating polygonal mirror 6, which occurs following the state of FIG. 13A (corresponding to signal 32). Also, the laser modulating frequency $fD_1$ and $fD_2$ is similarly selected. FIGS. 13D and 13E show laser modulating signals (corresponding to signals 301 and 302). Of the same, the portion denoted by m, m' shows signal waveforms of the pattern to be recorded (printed) and the modulating frequency is $fD_1$ or $fD_2$. The scanning period K/fM is determined in a fixed proportion to the number of revolutions of the rotating polygonal mirror and K is the constant for that proportion. The portion denoted by g, g' is that where a laser is turned on (lighted) for detecting the beam position for each scanning. FIG. 13F shows the signal output waveform from the scanning beam detector 15 as a sync. signal for determining the delivery timing of the dot signal representing the recording (printing) pattern. FIGS. 13G and 13H show sampling and holding times (corresponding to signals 331 and 332) of the sampled-data control system used for stabilizing the scanning beam spacing, in which $TS_1$ and $TS_2$ indicate sampling periods and $TH_1$ and $TH_2$ indicate holding periods. While the laser is turned on in the vicinity of the scanning starting position (TS, corresponding to g, g' in FIG. 13D, 13E), detection and control of the scanning beam spacing is performed, and this state is maintained during the period following it (TH), and these operations are repeated for each scanning.

Figure 13I:
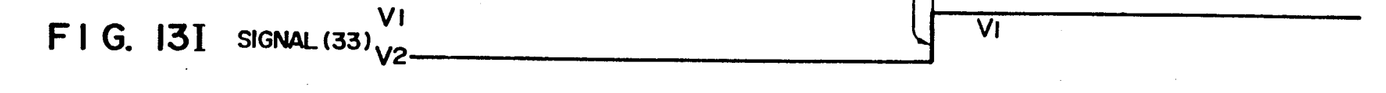

FIG. 13I shows the state of a voltage V to be applied to the electrodes 13 of the variable focal distance means 100a and 100b. Since $S_2$ shows the state of a compressed pattern, the variable dot density means 100a and 100b are not operated in the present embodiment. Since the state of $S_1$ corresponds to an expanded pattern, a suitable voltage $V_1$ is applied to the variable focal distance means 100a and 100b. It is also good to apply the voltage $V_1$ and $V_2$ which have different values, in accordance with the state of $S_1$ and $S_2$, to always operate the variable focal distance means 100a and 100b.

By operating the dynamic diffraction based on the time charts as described above, it is possible to change the spot diameter in the sub scanning direction following the change of the dot density even in the case of parallel scanning using a plurality of beams.

As a concrete example of the beam path adjuster 211, 212, as shown in the embodiment of FIG. 10, one employing electromagnetic drive represented by a galvano mirror or a piezoelectric element for minute adjustment of the mirror or the like being widely known may be used.

Although the case where two beams ar used for parallelly scanning was described above, the present embodiment is applicable to beam parallel scanning using more than two beams.

The present embodiment, as described so far, is provided with means to change the scanning beam spacing to prescribed values and to change in the sub scanning direction a spot diameter of each scanning beam in performing multi-beam parallel scanning with the use of a plurality of light sources, and therefore, it can change pixel density or printing dot density using the same arrangement to thereby product much higher quality image at all times for image formation. Besides, these operations can be achieved not requiring troublesome adjustments such as mechanical adjustment but can be achieved through electrical adjustment. Since the adjustments ca be performed relatively easily requiring no sophisticated adjustments, a great effect is obtained that a high-performance and easily operable light beam scanning apparatus can be provided.

As described above, a variable focal distance means of which focal distance can be freely changed in the sub scanning direction is inserted into the laser scanning optical system. By this arrangement an optimum focused laser spot size can be obtained each time by effectively utilizing the light quantity without substantially increasing the rotation speed of the polygon mirror it even if the scanning density has changed, so that more satisfactory picture quality can be obtained.

It is needless to mention that the object of the present invention can be achieved by placing the variable focal distance means in the scanning optical system even in the case of multi-spot scanning where a plurality of light sources are used as shown in FIG. 10.

The invention has been described with reference to the preferred and alternate embodiments. Obviously, modifications and alternations will occur to those of ordinary skill in the art upon reading and understanding the present invention. It is intended that the invention be construed as including all such modifications and alternations in so far they come with the scope of the appended claims or the equivalent thereof.

We claim:

1. A laser beam scanning apparatus comprising:
   a laser light source for emitting at least one laser beam; and
   a variable focal distance device,
   said variable focal distance device including:
   an optical waveguide which receives and conducts said laser beam; and
   electrode means having a plurality of electrodes provided on said optical waveguide so as to form in said optical waveguide a lens which can change in one direction the focused point of the laser beam passed through said optical waveguide in accordance with different voltages applied between the adjacent electrodes of said electrode means.

2. A laser beam scanning apparatus according to claim 1, wherein said plurality of electrodes are spaced in said one direction and have an equal length in the direction in which said laser beam passes through said optical waveguide.

3. A laser beam scanning apparatus comprising:
   a laser light source for emitting one laser beam; and
   a variable focal distance device provided to face said laser light source,
   said variable focal distance device including:
   an optical waveguide which receives and conducts said laser beam;
   electrode means having a plurality of electrodes provided on said optical waveguide so as to form in said optical waveguide a lens which can change in one direction the focused point of the laser beam passed through said optical waveguide in accordance with different voltages applied between the adjacent electrodes of said electrode means;
   deflection means for receiving and deflecting said laser beam from said variable focal distance device; and
   a scanning lens for causing said laser beam deflected by said deflection means to scan on a scan line.

4. A laser beam scanning apparatus according to claim 3, wherein said plurality of electrodes are spaced in said one direction and have an equal length in the direction in which said laser beam passes through said optical waveguide.

5. A laser beam scanning apparatus according to claim 3, further comprising:
   a lens for focusing said laser beam exiting from said variable focal distance device; and
   a slit provided around a point at which said laser beam exiting from said variable focal distance device is focused, said slit allowing a 0-order light ray of said laser beam to be passed therethrough.

* * * * *